(12) United States Patent
Karles et al.

(10) Patent No.: US 11,826,675 B2
(45) Date of Patent: Nov. 28, 2023

(54) E-VAPING DEVICE CARTRIDGE WITH SUPERABSORBENT POLYMER

(71) Applicant: Altria Client Services LLC, Richmond, VA (US)

(72) Inventors: Georgios Karles, Richmond, VA (US); Erica Sena, Midlothian, VA (US)

(73) Assignee: ALTRIA CLIENT SERVICES LLC, Richmond, VA (US)

(*) Notice: Subject to any disclaimer, the term of this patent is extended or adjusted under 35 U.S.C. 154(b) by 0 days.

(21) Appl. No.: 17/734,488

(22) Filed: May 2, 2022

(65) Prior Publication Data

US 2022/0258072 A1    Aug. 18, 2022

Related U.S. Application Data

(63) Continuation of application No. 16/413,977, filed on May 16, 2019, now Pat. No. 11,338,223, which is a
(Continued)

(51) Int. Cl.
*A24F 40/42* (2020.01)
*A24F 40/10* (2020.01)
(Continued)

(52) U.S. Cl.
CPC .............. *B01D 15/22* (2013.01); *A24F 40/42* (2020.01); *B01J 20/267* (2013.01); *B05D 5/00* (2013.01);
(Continued)

(58) Field of Classification Search
None
See application file for complete search history.

(56) References Cited

U.S. PATENT DOCUMENTS 3,200,819 A * 8/1965 Gilbert ................. A24F 40/485
                                                131/273
4,284,089 A * 8/1981 Ray ......................... A24F 42/60
                                                131/270
(Continued)

FOREIGN PATENT DOCUMENTS

CN          203538386 U     4/2014
EP          2668213 A1     12/2013
(Continued)

OTHER PUBLICATIONS

Phil Mango, Phil Mango Consulting, Oct. 4, 2011, http://www.nonwovens-industry.com/issues/2011-10/view_features/the-future-of-superabsorbents-in-foodpackagi.
(Continued)

*Primary Examiner* — Thor S Campbell
(74) *Attorney, Agent, or Firm* — Harness, Dickey & Pierce, P.L.C.

(57) ABSTRACT

A cartridge for an e-vaping device includes a reservoir configured to hold pre-vapor formulation, a vaporizer assembly configured to draw at least some of the pre-vapor formulation from the reservoir and vaporize the drawn pre-vapor formulation to form a vapor, and a superabsorbent polymer configured to absorb free water from pre-vapor formulation held in the reservoir. The superabsorbent polymer includes a cross-linked polyacrylate copolymer that is substantially inert to the pre-vapor formulation. The superabsorbent polymer may be included in a layer on one or more surfaces in the cartridge. The layer may include the superabsorbent polymer and a binder. The superabsorbent polymer may be included with the pre-vapor formulation in a formulation mixture. The superabsorbent polymer may be included in an interior of at least one element comprising the
(Continued)

cartridge. The superabsorbent polymer may be included in a separate compartment in the reservoir.

13 Claims, 7 Drawing Sheets

Related U.S. Application Data continuation of application No. 15/192,136, filed on Jun. 24, 2016, now Pat. No. 10,292,426.

(51) Int. Cl.
| | |
|---|---|
| A24F 40/70 | (2020.01) |
| B01D 15/22 | (2006.01) |
| D03D 15/50 | (2021.01) |
| D03D 15/283 | (2021.01) |
| D03D 15/00 | (2021.01) |
| B01J 20/26 | (2006.01) |
| B05D 5/00 | (2006.01) |
| B05D 7/22 | (2006.01) |
| B05D 7/24 | (2006.01) |
| B65D 81/26 | (2006.01) |

(52) U.S. Cl.
CPC .............. *B05D 7/227* (2013.01); *B05D 7/24* (2013.01); *B65D 81/264* (2013.01); *D03D 15/00* (2013.01); *D03D 15/283* (2021.01); *D03D 15/50* (2021.01); *A24F 40/10* (2020.01); *A24F 40/70* (2020.01)

(56) References Cited

U.S. PATENT DOCUMENTS

| | | | | |
|---|---|---|---|---|
| 5,992,700 | A * | 11/1999 | McGlothlin | A61M 5/1486 222/394 |
| 6,484,514 | B1 * | 11/2002 | Joseph | F24V 30/00 126/263.01 |
| 7,767,877 | B2 * | 8/2010 | Takahashi | D04H 1/4258 422/4 |
| 8,897,628 | B2 * | 11/2014 | Conley | A24F 40/42 392/386 |
| 2002/0117180 | A1 | 8/2002 | Hersh et al. | |
| 2007/0186945 | A1 * | 8/2007 | Olegario | A24D 1/00 131/362 |
| 2008/0092912 | A1 * | 4/2008 | Robinson | A24F 40/40 131/200 |
| 2009/0065436 | A1 * | 3/2009 | Kalayci | B01D 39/1623 502/402 |
| 2010/0200008 | A1 * | 8/2010 | Taieb | A24F 40/50 131/360 |
| 2011/0226236 | A1 * | 9/2011 | Buchberger | A61K 31/465 128/200.23 |
| 2012/0192882 | A1 | 8/2012 | Dube et al. | |
| 2012/0316528 | A1 * | 12/2012 | Kreuzer | A61F 13/534 604/374 |
| 2013/0023850 | A1 * | 1/2013 | Imran | A61N 1/325 604/501 |
| 2013/0056013 | A1 * | 3/2013 | Terry | A61M 11/041 131/328 |
| 2013/0074857 | A1 * | 3/2013 | Buchberger | A24F 7/02 131/329 |
| 2013/0319438 | A1 | 12/2013 | Liu | |
| 2014/0007891 | A1 | 1/2014 | Liu | |
| 2014/0039378 | A1 * | 2/2014 | Imran | A61N 1/30 604/20 |
| 2014/0060556 | A1 | 3/2014 | Liu | |
| 2014/0150783 | A1 | 6/2014 | Liu | |
| 2014/0182610 | A1 | 7/2014 | Liu | |
| 2014/0334802 | A1 * | 11/2014 | Dubief | A61L 9/03 392/390 |
| 2015/0000683 | A1 | 1/2015 | Liu | |
| 2015/0113873 | A1 * | 4/2015 | Balastre | C08F 220/38 47/58.1 SC |
| 2015/0164143 | A1 | 6/2015 | Maas | |
| 2015/0196058 | A1 * | 7/2015 | Lord | A24F 40/44 392/395 |
| 2015/0359266 | A1 | 12/2015 | Memari et al. | |
| 2016/0000149 | A1 * | 1/2016 | Scatterday | A24F 40/485 392/394 |
| 2016/0106154 | A1 * | 4/2016 | Lord | A24F 40/485 392/395 |
| 2016/0109115 | A1 * | 4/2016 | Lipowicz | H05B 3/0014 392/395 |
| 2016/0150824 | A1 * | 6/2016 | Memari | H02J 50/10 131/329 |
| 2016/0157525 | A1 * | 6/2016 | Tucker | H05B 3/34 392/395 |
| 2016/0183598 | A1 * | 6/2016 | Tucker | A24F 40/70 392/404 |
| 2017/0040648 | A1 * | 2/2017 | Tzidon | H01M 10/24 |
| 2017/0231278 | A1 * | 8/2017 | Mironov | G01F 23/26 392/390 |
| 2022/0258072 | A1 * | 8/2022 | Karles | B01J 20/267 |

FOREIGN PATENT DOCUMENTS

| | | |
|---|---|---|
| WO | WO-2012/103327 A1 | 8/2012 |
| WO | WO-2015/108816 A2 | 7/2015 |
| WO | WO-2015/128665 A1 | 9/2015 |

OTHER PUBLICATIONS

Guan er al, 2014, Scientific World Journal, PMID 25250387 (retrieved Jun. 24, 2016).

Electronic Cigarette super absorbent sponge, available at "http://www.spongeband.com/product_63370/Electronic-Cigarette-super-absorbent-sponge-bcc.html," (Retrieved Jun. 24, 2016).

International Search Report and Written Opinion dated Oct. 2, 2017 issued in corresponding International Patent Application No. PCT/EP2017/065606.

International Preliminary Report on Patentability for corresponding International Application No. PCT/EP2017/065606, dated Dec. 25, 2018.

Office Action dated Sep. 24, 2021 for corresponding U.S. Appl. No. 16/413,977.

\* cited by examiner

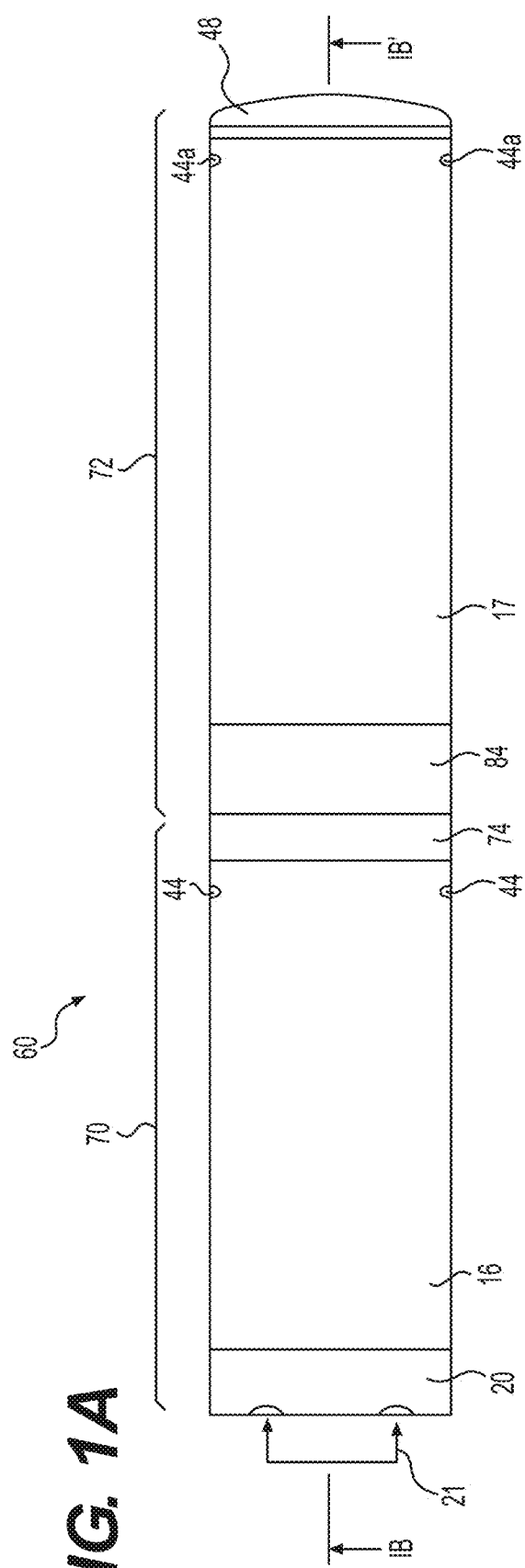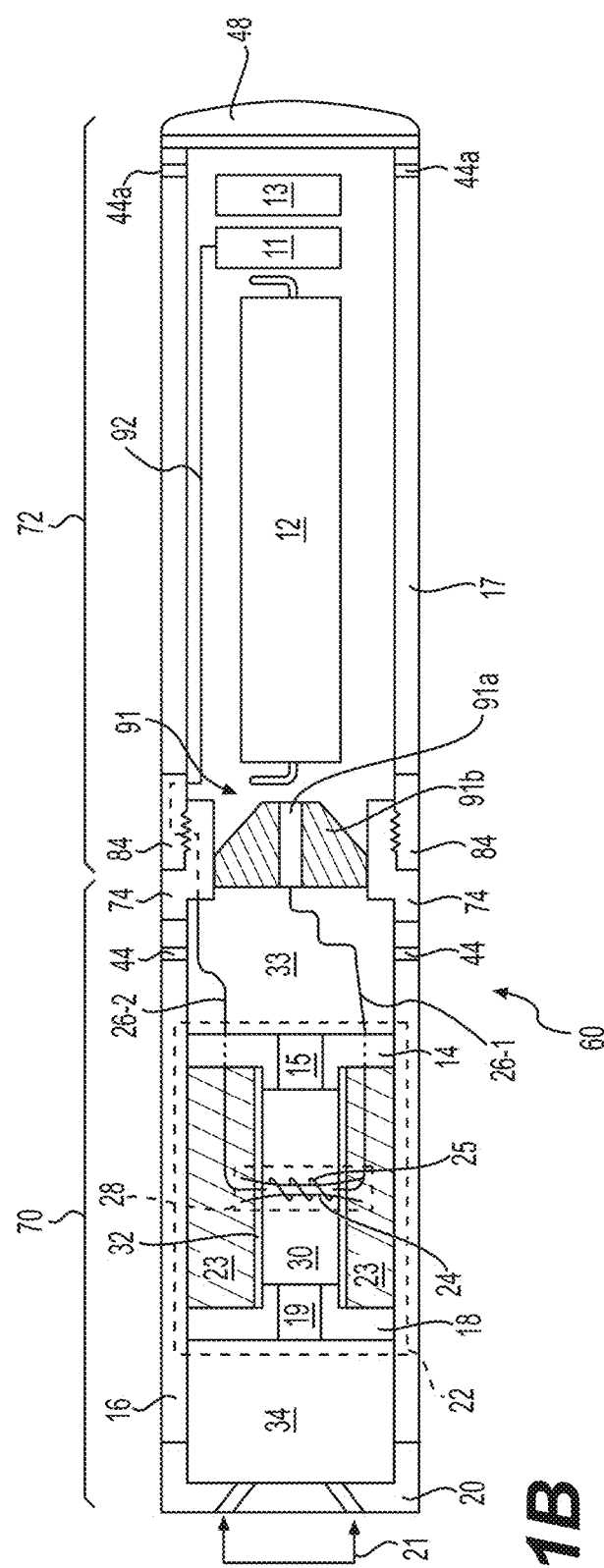

E-VAPING DEVICE CARTRIDGE WITH SUPERABSORBENT POLYMER

CROSS-REFERENCE TO RELATED APPLICATION(S)

This application is a continuation application of U.S. application Ser. No. 16/413,977, filed on May 16, 2019, which is a is a continuation application of U.S. application Ser. No. 15/192,136, filed Jun. 24, 2016, the entire contents of each of which are incorporated herein by reference.

BACKGROUND

Field

One or more example embodiments relate to electronic vaping and/or e-vaping devices.

Description of Related Art

E-vaping devices, also referred to herein as electronic vaping devices (EVDs) may be used by adult vapers for portable vaping. An e-vaping device may vaporize a pre-vapor formulation to form a vapor. The e-vaping device may include a reservoir that holds a pre-vapor formulation and a heating element that vaporizes the pre-vapor formulation by applying heat to at least a portion of the pre-vapor formulation.

In some cases, one or more elements in an e-vaping device may be a metallic element. A metallic element may be in fluid communication with a pre-vapor formulation in the e-vaping device.

In some cases, a metallic element in an e-vaping device may be at least partially corroded based on being in fluid communication with the pre-vapor formulation. Such corrosion may reduce an operational lifetime of the metallic element and/or may reduce a sensory experience provided by the e-vaping device.

SUMMARY

According to some example embodiments, a cartridge for an e-vaping device may include a reservoir configured to hold a pre-vapor formulation and a vaporizer assembly configured to draw at least some of the pre-vapor formulation from the reservoir. The reservoir may include a superabsorbent polymer in fluid communication with an interior of the reservoir. The superabsorbent polymer may be configured to absorb free water from the pre-vapor formulation held in the reservoir. The superabsorbent polymer may include a cross-linked polyacrylate copolymer that is substantially inert to the pre-vapor formulation. The vaporizer assembly may be configured to draw at least some of the pre-vapor formulation from the reservoir. The vaporizer assembly may be further configured to vaporize the drawn pre-vapor formulation to form a vapor.

The reservoir may include a superabsorbent layer on at least one surface, the at least one surface at least partially defining the interior of the reservoir. The superabsorbent layer may include the superabsorbent polymer and at least one binder.

The reservoir may include a storage medium configured to hold the pre-vapor formulation. The superabsorbent polymer may be included in the storage medium.

The reservoir may include a cylindrical outer housing at least partially defining an outer surface of the reservoir. An inner tube may define an inner surface of the reservoir, such that the reservoir interior is an annulus. A superabsorbent layer may be on at least one of the inner surface of the outer housing and the outer surface of the inner tube. The superabsorbent layer may include the superabsorbent polymer and at least one binder.

The superabsorbent polymer may be included within an interior of at least one of the outer housing and the inner tube.

The reservoir may include a formulation compartment and a superabsorbent compartment. The formulation compartment may be configured to hold the pre-vapor formulation. The superabsorbent compartment may include the superabsorbent polymer and a selectively-permeable partition. The partition may be configured to enable pre-vapor circulation between the formulation compartment and the superabsorbent compartment, and restrict the superabsorbent polymer to the superabsorbent compartment.

The selectively permeable partition may enclose the superabsorbent polymer within the formulation compartment.

According to some example embodiments, an e-vaping device may include a cartridge and a power supply. The cartridge may include a reservoir configured to hold a pre-vapor formulation and a vaporizer assembly configured to draw at least some of the pre-vapor formulation from the reservoir. The reservoir may include a superabsorbent polymer in fluid communication with an interior of the reservoir. The superabsorbent polymer may be configured to absorb free water from the pre-vapor formulation held in the reservoir the superabsorbent polymer including a cross-linked polyacrylate copolymer that is substantially inert to the pre-vapor formulation. The vaporizer assembly may be configured to draw at least some of the pre-vapor formulation from the reservoir. The vaporizer assembly may be further configured to vaporize the drawn pre-vapor formulation to form a vapor. The power supply may be configured to supply electrical power to the vaporizer assembly.

The reservoir may include a superabsorbent layer on at least one surface. The at least one surface may at least partially define the interior of the reservoir. The superabsorbent layer may include the superabsorbent polymer and at least one binder.

The reservoir may include a storage medium configured to hold the pre-vapor formulation. The superabsorbent polymer may be included in the storage medium.

The reservoir may include a cylindrical outer housing at least partially defining an outer surface of the reservoir, an inner tube defining an inner surface of the reservoir, such that the reservoir interior is an annulus, and a superabsorbent layer on at least one of the inner surface of the outer housing and the outer surface of the inner tube, the superabsorbent layer including the superabsorbent polymer and at least one binder.

The superabsorbent polymer may be included within an interior of at least one of the outer housing and the inner tube.

The reservoir may include a formulation compartment and a superabsorbent compartment, the formulation compartment configured to hold the pre-vapor formulation, the superabsorbent compartment including the superabsorbent polymer and a selectively-permeable partition. The partition may be configured to enable pre-vapor circulation between the formulation compartment and the superabsorbent compartment, and restrict the superabsorbent polymer to the superabsorbent compartment.

The selectively permeable partition may enclose the superabsorbent polymer within the formulation compartment.

The power supply may include a rechargeable battery.

The cartridge and the power supply may be removably coupled together.

According to some example embodiments, a cartridge for an e-vaping device may include a reservoir holding a formulation mixture and a vaporizer assembly configured to draw at least some of the pre-vapor formulation from the reservoir. The formulation mixture may include a pre-vapor formulation, and a superabsorbent polymer configured to absorb free water from the pre-vapor formulation. The superabsorbent polymer may include a cross-linked polyacrylate copolymer that is substantially inert to the pre-vapor formulation. The vaporizer assembly may be configured to draw at least some of the pre-vapor formulation from the reservoir. The vaporizer assembly may be further configured to vaporize the drawn pre-vapor formulation to form a vapor.

According to some example embodiments, a method may include configuring a cartridge to form a vapor based on vaporization of a substantially de-watered pre-vapor formulation. The cartridge may include a reservoir configured to hold a pre-vapor formulation and a vaporizer assembly configured to vaporize pre-vapor formulation drawn from the reservoir. The configuring may include applying a superabsorbent polymer to at least one surface configured to be in fluid communication with an interior of the reservoir. The superabsorbent polymer may be configured to absorb free water from the pre-vapor formulation. The superabsorbent polymer may include a cross-linked polyacrylate copolymer that is substantially inert to the pre-vapor formulation.

The reservoir may include a storage medium configured to hold the pre-vapor formulation within the interior of the reservoir, and applying the superabsorbent polymer includes applying the superabsorbent polymer to the storage medium.

The reservoir may include a cylindrical outer housing defining an outer surface of the reservoir and an inner tube defining an inner surface of the reservoir, such that the reservoir interior is an annulus. Applying the superabsorbent polymer includes applying a superabsorbent layer on at least one of the inner surface of the outer housing and the outer surface of the inner tube. The superabsorbent layer may include the superabsorbent polymer and at least one binder.

The superabsorbent polymer may include a fibrous material. Applying the superabsorbent polymer may include weaving the superabsorbent polymer into the at least one surface. Applying the superabsorbent polymer may include impregnating the superabsorbent polymer into an interior of the at least one surface.

BRIEF DESCRIPTION OF THE DRAWINGS

The various features and advantages of the non-limiting embodiments described herein become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 1A is a side view of an e-vaping device according to some example embodiments.

FIG. 1B is a cross-sectional view along line IB-IB' of the e-vaping device of FIG. 1A.

DETAILED DESCRIPTION OF EXAMPLE EMBODIMENTS

Figure 2A:
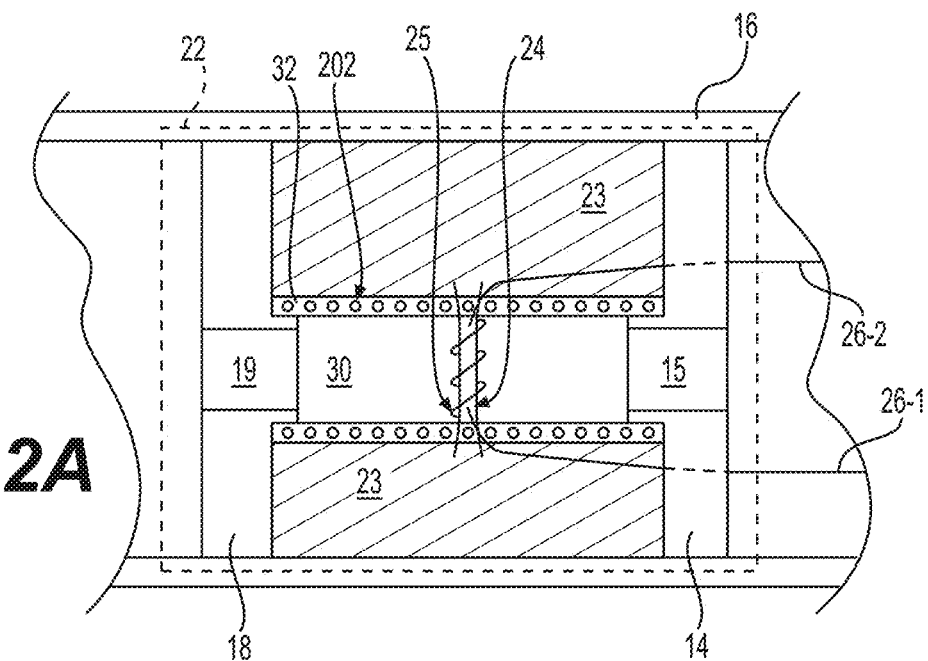
FIG. 2A is a cross-sectional view of a vapor generator that includes a superabsorbent polymer, according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1A is a side view of an e-vaping device 60 according to some example embodiments. FIG. 1B is a cross-sectional view along line IB-IB' of the e-vaping device of FIG. 1A. The e-vaping device 60 may include one or more of the features set forth in U.S. Patent Application Publication No. 2013/0192623 to Tucker et al. filed Jan. 31, 2013 and U.S. Patent Application Publication No. 2013/0192619 to Tucker et al. filed Jan. 14, 2013, the entire contents of each of which are incorporated herein by reference thereto. As used herein, the term "e-vaping device" is inclusive of all types of electronic vaping devices, regardless of form, size or shape.

Referring to FIG. 1A and FIG. 1B, an e-vaping device 60 includes a replaceable cartridge (or first section) 70 and a reusable power supply section (or second section) 72. Sections 70, 72 are removably coupled together at complimentary interfaces 74, 84 of the respective cartridge 70 and power supply section 72.

In some example embodiments, the interfaces 74, 84 are threaded connectors. It should be appreciated that each interface 74, 84 may be any type of connector, including a snug-fit, detent, clamp, bayonet, and/or clasp. One or more of the interfaces 74, 84 may include a cathode connector, anode connector, some combination thereof, etc. to electrically couple one or more elements of the cartridge 70 to one or more power supplies 12 in the power supply section 72 when the interfaces 74, 84 are coupled together.

As shown in FIG. 1A and FIG. 1B, in some example embodiments, an outlet end insert 20 is positioned at an outlet end of the cartridge 70. The outlet end insert 20 includes at least one outlet port 21 that may be located off-axis from the longitudinal axis of the e-vaping device 60. The at least one outlet port 21 may be angled outwardly in relation to the longitudinal axis of the e-vaping device 60. Multiple outlet ports 21 may be uniformly or substantially uniformly distributed about the perimeter of the outlet end insert 20 so as to uniformly or substantially uniformly distribute a vapor drawn through the outlet end insert 20 during vaping. Thus, as a vapor is drawn through the outlet end insert 20, the vapor may move in different directions.

The cartridge 70 includes a vapor generator 22. The vapor generator 22 includes at least a portion of an outer housing 16 of the cartridge 70 extending in a longitudinal direction and an inner tube (or chimney) 32 coaxially positioned within the outer housing 16. The power supply section 72 includes an outer housing 17 extending in a longitudinal direction. In some example embodiments, the outer housing 16 may be a single tube housing both the cartridge 70 and the power supply section 72. In the example embodiment illustrated in FIG. 1A and FIG. 1B, the entire e-vaping device 60 may be disposable.

The outer housings 16, 17 may each have a generally cylindrical cross-section. In some example embodiments, the outer housings 16, 17 may each have a generally triangular cross-section along one or more of the cartridge 70 and the power supply section 72. In some example embodiments, the outer housing 17 may have a greater circumference or dimensions at a tip end than a circumference or dimensions of the outer housing 16 at an outlet end of the e-vaping device 60.

At one end of the inner tube 32, a nose portion of a gasket (or seal) 14 is fitted into an end portion of the inner tube 32. An outer perimeter of the gasket 14 provides a substantially airtight seal with an interior surface of the outer housing 16. The gasket 14 includes a channel 15. The channel 15 opens into an interior of the inner tube 32 that defines a central channel 30. A space 33 at a backside portion of the gasket 14 assures communication between the channel 15 and one or more air inlet ports 44. Air may be drawn into the space 33 in the cartridge 70 through the one or more air inlet ports 44 during vaping, and the channel 15 may enable such air to be drawn into the central channel 30 of the vapor generator 22.

In some example embodiments, a nose portion of another gasket 18 is fitted into another end portion of the inner tube 32. An outer perimeter of the gasket 18 provides a substantially tight seal with an interior surface of the outer housing 16. The gasket 18 includes a channel 19 disposed between the central channel 30 of the inner tube 32 and a space 34 at an outlet end of the outer housing 16. The channel 19 may transport a vapor from the central channel 30 to exit the vapor generator 22 to the space 34. The vapor may exit the cartridge 70 from space 34 through the outlet end insert 20.

In some example embodiments, at least one air inlet port 44 is formed in the outer housing 16, adjacent to the interface 74 to reduce and/or minimize the chance of an adult vaper's fingers occluding one of the ports and to control the resistance-to-draw (RTD) during vaping. In some example embodiments, the air inlet ports 44 may be machined into the outer housing 16 with precision tooling such that their diameters are closely controlled and replicated from one e-vaping device 60 to the next during manufacture.

In a further example embodiment, the air inlet ports 44 may be drilled with carbide drill bits or other high-precision tools and/or techniques. In yet a further example embodiment, the outer housing 16 may be formed of metal or metal alloys such that the size and shape of the air inlet ports 44 may not be altered during manufacturing operations, packaging, and/or vaping. Thus, the air inlet ports 44 may provide more consistent RTD. In yet a further example embodiment, the air inlet ports 44 may be sized and configured such that the e-vaping device 60 has a RTD in the range of from about 60 mm $H_2O$ to about 150 mm $H_2O$.

Still referring to FIG. 1A and FIG. 1B, the vapor generator 22 includes a reservoir 23. The reservoir 23 is configured to hold one or more pre-vapor formulations. The reservoir 23 is contained in an outer annulus between the inner tube 32 and the outer housing 16 and between the gaskets 14 and 18. Thus, the reservoir 23 at least partially surrounds the central channel 30. The reservoir 23 may include a storage medium configured to store the pre-vapor formulation therein. A storage medium included in a reservoir 23 may include a winding of cotton gauze or other fibrous material about a portion of the cartridge 70.

In some example embodiments, the reservoir 23 is configured to hold different pre-vapor formulations. For example, the reservoir 23 may include one or more sets of storage media, where the one or more sets of storage media are configured to hold different pre-vapor formulations.

A pre-vapor formulation, as described herein, is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or pre-vapor formulation such as glycerin and propylene glycol. Different pre-vapor formulations may include different elements. Different pre-vapor formulations may have different properties. For example, different pre-vapor formulations may have different viscosities when the different pre-vapor formulations are at a common temperature. One or more of pre-vapor formulations may include those described in U.S. Patent Application Publication No. 2015/0020823 to Lipowicz et al. filed Jul. 16, 2014 and U.S. Patent Application Publication No. 2015/0313275 to Anderson et al. filed Jan. 21, 2015, the entire contents of each of which is incorporated herein by reference thereto.

Still referring to FIG. 1A and FIG. 1B, in some example embodiments, the reservoir 23 includes a superabsorbent polymer in fluid communication with an interior of the reservoir 23. The superabsorbent polymer may be in fluid communication with the pre-vapor formulation in the reservoir 23. The superabsorbent polymer may be substantially inert to the pre-vapor formulation.

The superabsorbent polymer may absorb one or more fluids, including one or more liquid materials. The one or more fluids may include one or more polar compound materials, including water, ethanol, some combination thereof, or the like. The superabsorbent polymer may absorb one or more fluids, including free water, from the pre-vapor formulation held in the reservoir 23. The pre-vapor formulation held in the reservoir 23 may be hygroscopic and may absorb an amount of water, from the atmosphere, that is equal to or greater than 10% of the mass of the pre-vapor formulation at saturation (100% relative humidity). The superabsorbent polymer may absorb such water (free water, "moisture," etc.) from the pre-vapor formulation.

The superabsorbent polymer, the one or more locations of the superabsorbent polymer relative to one or more portions of the reservoir 23, the absorbing of free water by the superabsorbent layer, some combination thereof, or the like are described in further detail below with reference to FIGS. 2A-G.

Based on including a superabsorbent polymer that may absorb free water from the pre-vapor formulation, the cartridge 70 may be configured to reduce and/or prevent corrosion of metallic elements of the cartridge 70 by free water. Such metallic elements may include, for example, at least one of the heating element 25 and the electrical leads 26-1 and 26-2. In addition, the cartridge 70 may be configured to reduce and/or prevent partitioning of one or more elements in a vapor formed in the cartridge 70 based on the presence of free water in the pre-vapor formulation. Therefore, the cartridge 70 may be configured to reduce and/or prevent a harshness of the sensory experience that may be provided by a vapor that includes such partitioning.

As described further below with reference to FIGS. 2A-G, the superabsorbent polymer may be included in the reservoir 23 in the form of a powder, as dispersed particles or fibers, as a layer on one or more surfaces in the cartridge 70, as a mixture with a material included in the cartridge 70, as a part of a mixture with the pre-vapor formulation, as a fibrous material that is interwoven with a material comprising one or more elements of the cartridge 70, some combination thereof, or the like.

The superabsorbent polymer may be a cross-linked polyacrylate copolymer that may be safely used as an article or element of one or more articles configured for use in contact with food. The superabsorbent polymer may include one or more cross-linked polyacrylate copolymers. The cross-linked polyacrylate copolymers may include at least one of grafted copolymers of cross-linked sodium polyacrylate identified as 2-propenoic acid, polymers with N,N-di-2-propenyl-2-propen-1-amine and hydrolyzed polyvinyl acetate, sodium salts, graft (CAS Reg. No. 166164-74-5), and 2-propenoic acid, polymers with 2-ethyl-2-(((1-oxo-2-propenyl)oxy)methyl)-1,3-propanediyl di-2-propenoate and sodium 2-propenoate (CAS Reg. No. 76774-25-9). The cross-linked polyacrylate copolymers may include one or more adjuvant substances used in the production of such copolymers. The one or more adjuvant substances may include one or more substances generally recognized as safe in food, and one or more substances used in accordance with a prior government sanction or approval. The cross-linked polyacrylate copolymers may yield low molecular weight (less than 1,000 Daltons) extractives of no more than 0.15 percent by weight of the total polymer when extracted with 0.2 percent by weight of aqueous sodium chloride solution at 20° C. for 24 hours. The low molecular weight extractives may be determined using size exclusion chromatography or an equivalent method.

Still referring to FIG. 1A and FIG. 1B, the vapor generator 22 includes a vaporizer assembly 28. The vaporizer assembly 28 is configured to vaporize at least a portion of the pre-vapor formulation held in the reservoir 23 to form a vapor.

The vaporizer assembly 28 includes a dispensing interface 24. The dispensing interface 24 may be coupled to the reservoir 23. The dispensing interface 24 is configured to draw one or more pre-vapor formulations from the reservoir 23. Pre-vapor formulation drawn from the reservoir 23 into the dispensing interface 24 may be drawn into an interior of the dispensing interface 24. It will be understood, therefore, that pre-vapor formulation drawn from a reservoir 23 into a dispensing interface 24 may include pre-vapor formulation held in the dispensing interface 24.

Still referring to FIG. 1A and FIG. 1B, the vaporizer assembly 28 further includes a heating element 25. The heating element 25 may be coupled to the dispensing interface 24. In some example embodiments, the heating element 25 may be directly coupled to the dispensing interface 24 such that the heating element 25 is coupled to an exterior surface of the dispensing interface 24. The heating element 25 may at least partially surround a portion of the dispensing interface 24 such that when the heating element 25 is activated, one or more pre-vapor formulations in the dispensing interface 24 may be vaporized by the heating element 25 to form a vapor. In some example embodiments, including the example embodiment illustrated in FIG. 1B, the heating element 25 completely surrounds the dispensing interface 24.

Figure 2B:
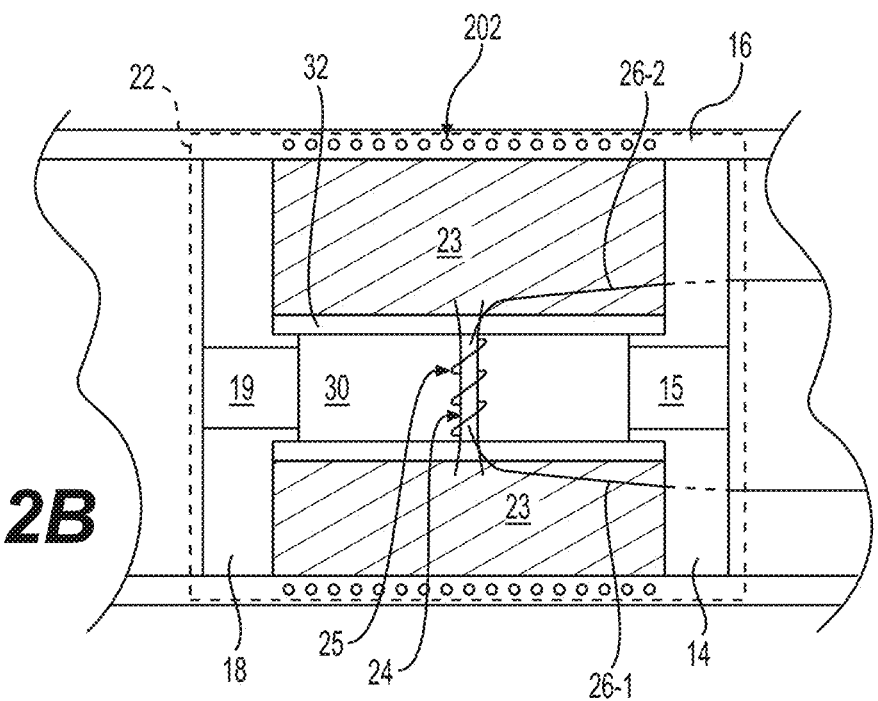
FIG. 2B is a cross-sectional view of a vapor generator that includes a superabsorbent polymer, according to some example embodiments.

In some example embodiments, including the example embodiments shown in FIG. 1B, and as shown further with reference to FIG. 2A and FIG. 2B, the heating element 25 includes a heater coil wire that extends around the exterior surface of the dispensing interface 24. The heating element 25 may heat one or more portions of the dispensing interface 24, including at least some of the pre-vapor formulation held in the dispensing interface 24, to vaporize the at least some of the pre-vapor formulation held in the dispensing interface 24.

The heating element 25 may heat one or more pre-vapor formulations in the dispensing interface 24 through thermal conduction. Alternatively, heat from the heating element 25 may be conducted to the one or more pre-vapor formulations by a heated conductive element or the heating element 25 may transfer heat to the incoming ambient air that is drawn through the e-vaping device 60 during vaping. The heated ambient air may heat the pre-vapor formulation by convection.

The dispensing interface 24 is configured to draw a pre-vapor formulation from the reservoir 23. The pre-vapor formulation drawn from the reservoir 23 into the dispensing interface 24 may be vaporized from the dispensing interface 24 based on heat generated by the heating element 25. During vaping, pre-vapor formulation may be transferred from the reservoir 23 and/or storage medium in the proximity of the heating element 25 through capillary action of the dispensing interface 24.

Still referring to FIG. 1A and FIG. 1B, in some example embodiments, the cartridge 70 includes a connector element 91. Connector element 91 may include one or more of a cathode connector element and an anode connector element. In the example embodiment illustrated in FIG. 1B, for example, electrical lead 26-1 is coupled to the connector element 91. As further shown in FIG. 1B, the connector element 91 is configured to couple with a power supply 12 included in the power supply section 72. If and/or when interfaces 74, 84 are coupled together, the connector element 91 and power supply 12 may be coupled together. Coupling connector element 91 and power supply 12 together may electrically couple lead 26-1 and power supply 12 together.

In some example embodiments, one or more of the interfaces 74, 84 include one or more of a cathode connector element and an anode connector element. In the example embodiment illustrated in FIG. 1B, for example, electrical lead 26-2 is coupled to the interface 74. As further shown in FIG. 1B, the power supply section 72 includes a lead 92 that couples the control circuitry 11 to the interface 84. If and/or when interfaces 74, 84 are coupled together, the coupled interfaces 74, 84 may electrically couple leads 26-2 and 92 together.

If and/or when interfaces 74, 84 are coupled together, one or more electrical circuits through the cartridge 70 and power supply section 72 may be established. The established electrical circuits may include at least the heating element 25, the control circuitry 11, and the power supply 12. The electrical circuit may include leads 26-1 and 26-2, lead 92, and interfaces 74, 84.

The connector element 91 may include an insulating material 91b and a conductive material 91a. The conductive material 91a may electrically couple lead 26-1 to power supply 12, and the insulating material 91b may insulate the conductive material 91a from the interface 74, such that a probability of an electrical short between the lead 26-1 and the interface 74 is reduced and/or prevented. For example, if and/or when the connector element 91 includes a cylindrical cross-section orthogonal to a longitudinal axis of the e-vaping device 60, the insulating material 91b included in connector element 91 may be in an outer annular portion of the connector element 91 and the conductive material 91a may be in an inner cylindrical portion of the connector element 91, such that the insulating material 91b surrounds the conductive material 91a and reduces and/or prevents a probability of an electrical connection between the conductive material 91a and the interface 74.

Still referring to FIG. 1A and FIG. 1B, the power supply section 72 includes a sensor 13 responsive to air drawn into the power supply section 72 through an air inlet port 44a adjacent to a free end or tip end of the e-vaping device 60, a power supply 12, and control circuitry 11. In some example embodiments, including the example embodiment illustrated in FIG. 1B, the sensor 13 may be coupled to control circuitry 11 through lead 98. In some example embodiments, the sensor 13 may be coupled to control circuitry 11 through the electrode element 96 and the power supply 12. The power supply 12 may include a rechargeable battery. The sensor 13 may be one or more of a pressure sensor, a microelectromechanical system (MEMS) sensor, etc.

In some example embodiments, the power supply 12 includes a battery arranged in the e-vaping device 60 such that the anode is downstream of the cathode. A connector element 91 contacts the downstream end of the battery. The heating element 25 is coupled to the power supply 12 by at least the two spaced apart electrical leads 26-1 to 26-2.

The power supply 12 may be a Lithium-ion battery or one of its variants, for example a Lithium-ion polymer battery. Alternatively, the power supply 12 may be a nickel-metal hydride battery, a nickel cadmium battery, a lithium-manganese battery, a lithium-cobalt battery or a fuel cell. The e-vaping device 60 may be usable by an adult vaper until the energy in the power supply 12 is depleted or in the case of lithium polymer battery, a minimum voltage cut-off level is achieved. Further, the power supply 12 may be rechargeable and may include circuitry configured to allow the battery to be chargeable by an external charging device. To recharge the e-vaping device 60, a Universal Serial Bus (USB) charger or other suitable charger assembly may be used.

Still referring to FIG. 1A and FIG. 1B, upon completing the connection between the cartridge 70 and the power supply section 72, the power supply 12 may be electrically connected with the heating element 25 of the cartridge 70 upon actuation of the sensor 13. Air is drawn primarily into the cartridge 70 through one or more air inlet ports 44. The one or more air inlet ports 44 may be located along the outer housing 16 or at one or more of the interfaces 74, 84.

The sensor 13 may be configured to sense an air pressure drop and initiate application of voltage from the power supply 12 to the heating element 25. As shown in the example embodiment illustrated in FIG. 1B, some example embodiments of the power supply section 72 include a heater activation light 48 configured to glow when the heating element 25 is activated. The heater activation light 48 may include a light emitting diode (LED). Moreover, the heater activation light 48 may be arranged to be visible to an adult vaper during vaping. In addition, the heater activation light 48 may be utilized for e-vaping system diagnostics or to indicate that recharging is in progress. The heater activation light 48 may also be configured such that the adult vaper may activate and/or deactivate the heater activation light 48 for privacy. As shown in FIG. 1A and FIG. 1B, the heater activation light 48 may be located on the tip end of the e-vaping device 60. In some example embodiments, the heater activation light 48 may be located on a side portion of the outer housing 17.

In addition, the at least one air inlet port 44a may be located adjacent to the sensor 13, such that the sensor 13 may sense air flow indicative of vapor being drawn through the outlet end of the e-vaping device 60. The sensor 13 may activate the power supply 12 and the heater activation light 48 to indicate that the heating element 25 is activated.

In some example embodiments, the control circuitry 11 may control the supply of electrical power to the heating element 25 responsive to the sensor 13. In some example embodiments, the control circuitry 11 is configured to adjustably control the electrical power supplied to the heating element 25. Adjustably controlling the supply of electrical power may include controlling the supply of electrical power such that supplied electrical power has a determined set of characteristics, where the determined set of characteristics may be adjusted. To adjustably control the supply of electrical power, the control circuitry 11 may control the supply of electrical power such that electrical power having one or more characteristics determined by the control circuitry 11 is supplied to the heating element 25. Such one or more selected characteristics may include one or more of voltage and current of the electrical power. Such one or more selected characteristics may include a magnitude of the electrical power. It will be understood that adjustably controlling the supply of electrical power may include determining a set of characteristics of electrical power and controlling the supply of electrical power such that electrical power supplied to the heating element 25 has the determined set of characteristics.

In some example embodiments, the control circuitry 11 may include a maximum, time-period limiter. In some example embodiments, the control circuitry 11 may include a manually operable switch for an adult vaper to initiate a vaping. The time-period of the electric current supply to the heating element 25 may be given, or alternatively pre-set (e.g., prior to controlling the supply of electrical power to the heating element 25), depending on the amount of pre-vapor formulation desired to be vaporized. In some example embodiments, the control circuitry 11 may control the supply of electrical power to the heating element 25 as long as the sensor 13 detects a pressure drop.

To control the supply of electrical power to heating element 25, the control circuitry 11 may execute one or more instances of computer-executable program code. The control circuitry 11 may include a processor and a memory. The memory may be a computer-readable storage medium storing computer-executable code.

The control circuitry 11 may include processing circuitry including, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. In some example embodiments, the control circuitry 11 may be at least one of an application-specific integrated circuit (ASIC) and an ASIC chip.

The control circuitry 11 may be configured as a special purpose machine by executing computer-readable program code stored on a storage device. The program code may include program or computer-readable instructions, software elements, software modules, data files, data structures, and/or the like, capable of being implemented by one or more hardware devices, such as one or more of the control circuitry mentioned above. Examples of program code include both machine code produced by a compiler and higher level program code that is executed using an interpreter.

The control circuitry 11 may include one or more electronic storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a USB flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device through a network interface, rather than through a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, through a wired interface, an air interface, and/or any other like medium.

The control circuitry 11 may be a special purpose machine configured to execute the computer-executable code to control the supply of electrical power to heating element 25. In some example embodiments, an instance of computer-executable code, when executed by the control circuitry 11, causes the control circuitry 11 to control the supply of electrical power to heating element 25 according to an activation sequence. Controlling the supply of electrical power to heating element 25 may be referred to herein interchangeably as activating the one or more heating element 25.

Still referring to FIG. 1A and FIG. 1B, when activated, the heating element 25 may heat a portion of the dispensing interface 24 surrounded by the heating element 25 for less than about 10 seconds. Thus, the power cycle (or maximum vaping length) may range in period from about 2 seconds to about 10 seconds (e.g., about 3 seconds to about 9 seconds, about 4 seconds to about 8 seconds or about 5 seconds to about 7 seconds).

In some example embodiments, the heating element 25 is electrically coupled to the control circuitry 11. The control circuitry 11 may adjustably control the supply of electrical power to the heating element 25 to control an amount of heat generated by the heating element 25.

In some example embodiments, the dispensing interface 24 includes an absorbent material, the absorbent material being arranged in fluidic communication with the heating element 25. The absorbent material may include a wick having an elongated form and arranged in fluidic communication with the reservoir 23. The wick may include a wicking material. The wicking material may be a fibrous wicking material. The wicking material may extend into reservoir 23.

The pre-vapor formulation may include nicotine or may exclude nicotine. The pre-vapor formulation may include one or more tobacco flavors. The pre-vapor formulation may include one or more flavors that are separate from one or more tobacco flavors.

In some example embodiments, a pre-vapor formulation that includes nicotine may also include one or more acids. The one or more acids may be one or more of pyruvic acid, formic acid, oxalic acid, glycolic acid, acetic acid, isovaleric acid, valeric acid, propionic acid, octanoic acid, lactic acid, levulinic acid, sorbic acid, malic acid, tartaric acid, succinic acid, citric acid, benzoic acid, oleic acid, aconitic acid, butyric acid, cinnamic acid, decanoic acid, 3,7-dimethyl-6-octenoic acid, 1-glutamic acid, heptanoic acid, hexanoic acid, 3-hexenoic acid, trans-2-hexenoic acid, isobutyric acid, lauric acid, 2-methylbutyric acid, 2-methylvaleric acid, myristic acid, nonanoic acid, palmitic acid, 4-penenoic acid, phenylacetic acid, 3-phenylpropionic acid, hydrochloric acid, phosphoric acid, sulfuric acid and combinations thereof.

The storage medium of one or more reservoirs 23 may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section that has a Y-shape, cross shape, clover shape or any other suitable shape. In some example embodiments, one or more reservoirs 23 may include a filled tank lacking any storage medium and containing only pre-vapor formulation.

Still referring to FIG. 1A and FIG. 1B, the reservoir 23 may be sized and configured to hold enough pre-vapor formulation such that the e-vaping device 60 may be configured for vaping for at least about 200 seconds. The e-vaping device 60 may be configured to allow each vaping to last a maximum of about 5 seconds.

The dispensing interface 24 may include a wicking material that includes filaments (or threads) having a capacity to draw one or more pre-vapor formulations. For example, a dispensing interface 24 may be a bundle of glass (or ceramic) filaments, a bundle including a group of windings of glass filaments, etc., all of which arrangements may be capable of drawing pre-vapor formulation through capillary action by interstitial spacings between the filaments. The filaments may be generally aligned in a direction perpendicular (transverse) or substantially perpendicular to the longitudinal direction of the e-vaping device 60. In some example embodiments, the dispensing interface 24 may include one to eight filament strands, each strand comprising a plurality of glass filaments twisted together. The end portions of the dispensing interface 24 may be flexible and foldable into the confines of one or more reservoirs 23. The filaments may have a cross-section that is generally cross-shaped, clover-shaped, Y-shaped, or in any other suitable shape.

The dispensing interface 24 may include any suitable material or combination of materials, also referred to herein as wicking materials. Examples of suitable materials may be, but not limited to, glass, ceramic- or graphite-based materials. The dispensing interface 24 may have any suitable capillary drawing action to accommodate pre-vapor formulations having different physical properties such as density, viscosity, surface tension and vapor pressure.

In some example embodiments, the heating element 25 may include a wire coil that at least partially surrounds the dispensing interface 24. The wire coil may be referred to as a heating coil wire. The heating coil wire may be a metal wire and/or the heating coil wire may extend fully or partially along the length of the dispensing interface 24. The heating coil wire may further extend fully or partially around the circumference of the dispensing interface 24. In some example embodiments, the heating coil wire may or may not be in contact with the outer surface of the dispensing interface 24.

The heating element 25 may be formed of any suitable electrically resistive materials. Examples of suitable electrically resistive materials may include, but not limited to, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heating element 25 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heating element 25 may include at least one material selected from the group consisting of stainless steel, copper, copper alloys, nickel-chromium alloys, super alloys and combinations thereof. In some example embodiments, the heating element 25 may be formed of nickel-chromium alloys or iron-chromium alloys. In some example embodiments, the heating element 25 may be a ceramic heater having an electrically resistive layer on an outside surface thereof.

The dispensing interface 24 may extend transversely across the central channel 30 between opposing portions of the reservoir 23. In some example embodiments, the dispensing interface 24 may extend parallel or substantially parallel to a longitudinal axis of the central channel 30. In some example embodiments, including the example embodiment illustrated in FIG. 1B, the dispensing interface 24 may extend orthogonally or substantially orthogonally to the longitudinal axis of the central channel 30.

In some example embodiments, the heating element 25 is a porous material that incorporates a resistance heater formed of a material having a relatively high electrical resistance capable of generating heat relatively quickly.

In some example embodiments, the cartridge 70 may be replaceable. In other words, once the pre-vapor formulation of the cartridge 70 is depleted, only the cartridge 70 need be replaced. In some example embodiments, the entire e-vaping device 60 may be disposed once the reservoir 23 is depleted.

In some example embodiments, the e-vaping device 60 may be about 80 mm to about 110 mm long and about 7 mm to about 8 mm in diameter. For example, the e-vaping device 60 may be about 84 mm long and may have a diameter of about 7.8 mm.

Figure 2C:
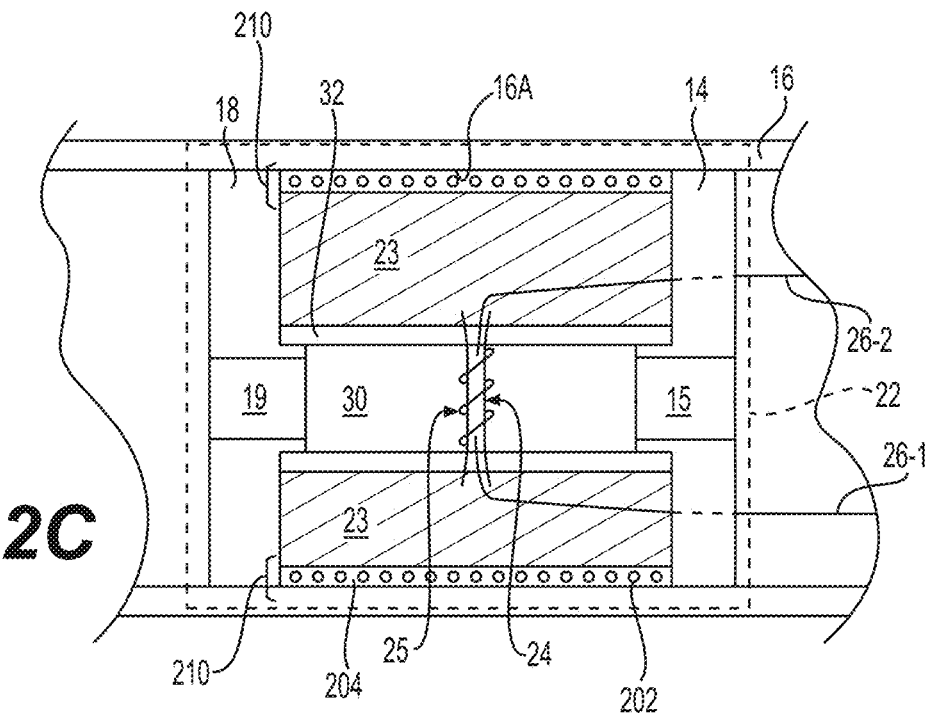
FIG. 2C is a cross-sectional view of a vapor generator that includes a superabsorbent layer, according to some example embodiments.
Figure 2D:
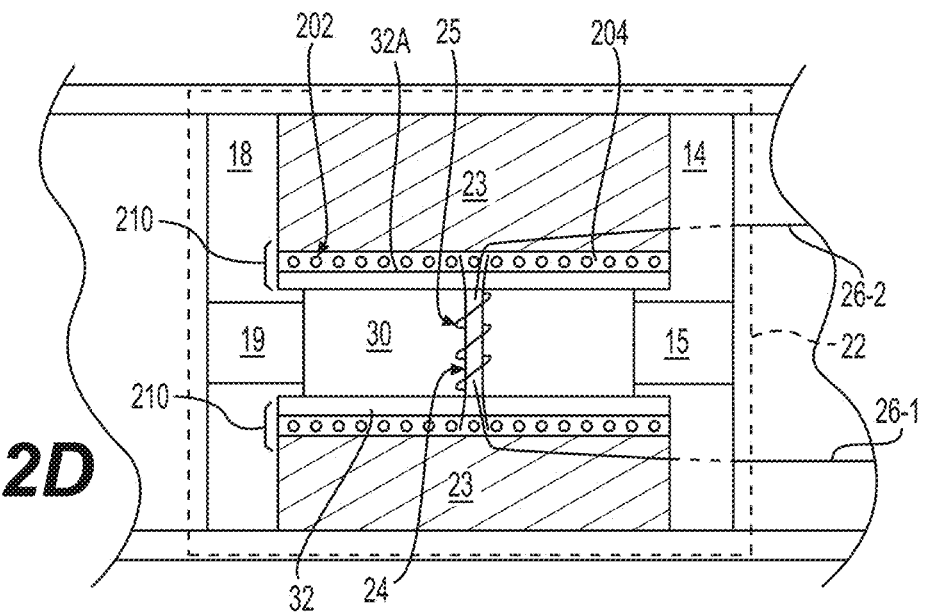
FIG. 2D is a cross-sectional view of a vapor generator that includes a superabsorbent layer, according to some example embodiments.
Figure 2E:
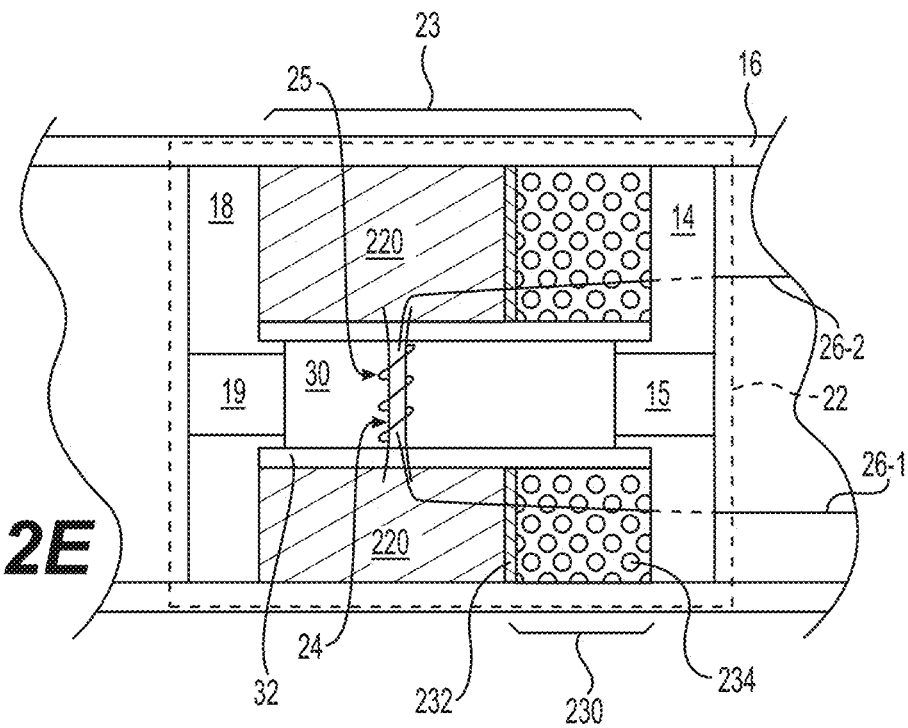
FIG. 2E is a cross-sectional view of a vapor generator that includes a superabsorbent compartment, according to some example embodiments.
Figure 2F:
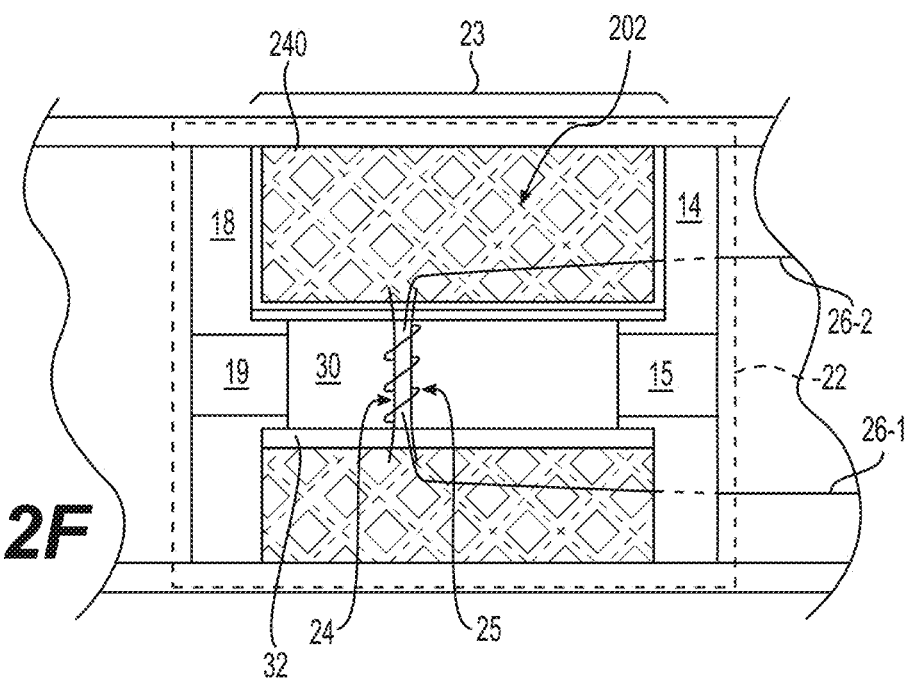
FIG. 2F is a cross-sectional view of a vapor generator that includes a superabsorbent polymer within a storage medium in the reservoir, according to some example embodiments.
Figure 2G:
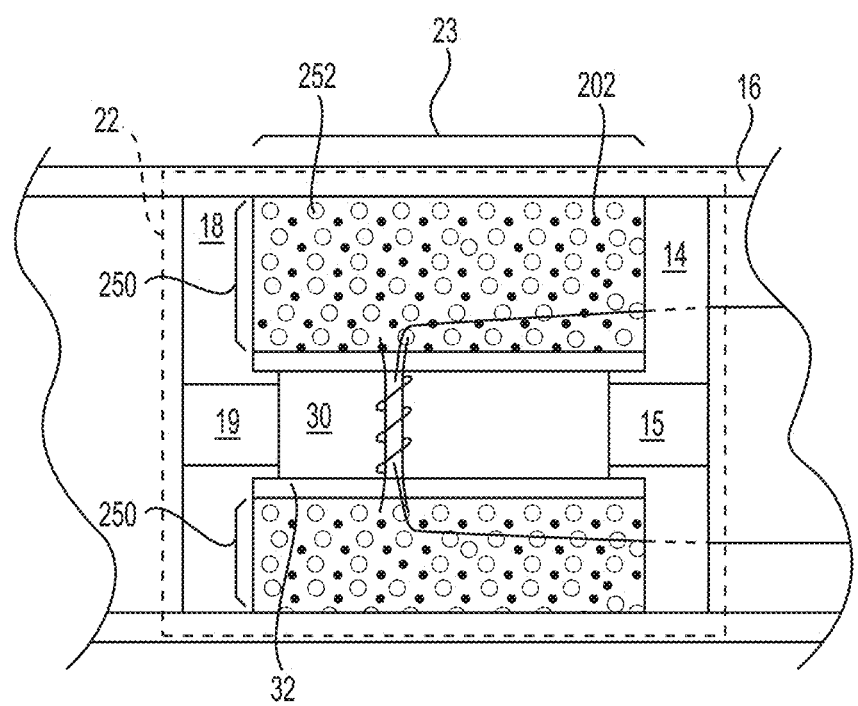
FIG. 2G is a cross-sectional view of a vapor generator that includes a reservoir holding a formulation mixture of pre-vapor formulation and superabsorbent polymer, according to some example embodiments.

FIG. 2A is a cross-sectional view of a vapor generator 22 that includes a superabsorbent polymer 202 within a tube 32, according to some example embodiments. FIG. 2B is a cross-sectional view of a vapor generator 22 that includes a superabsorbent polymer 202 within at least a portion of the outer housing 16, according to some example embodiments. FIG. 2C is a cross-sectional view of a vapor generator 22 that includes a superabsorbent layer 210 on an inner surface of at least a portion of the outer housing 16, according to some example embodiments. FIG. 2D is a cross-sectional view of a vapor generator 22 that includes a superabsorbent layer 210 on an outer surface of at least a portion of tube 32, according to some example embodiments. FIG. 2E is a cross-sectional view of a vapor generator 22 that includes a superabsorbent compartment 230, according to some example embodiments. FIG. 2F is a cross-sectional view of a vapor generator 22 that includes a superabsorbent polymer 202 within a storage medium in the reservoir 23, according to some example embodiments. FIG. 2G is a cross-sectional view of a vapor generator 22 that includes a reservoir 23 holding a formulation mixture 250 of pre-vapor formulation 252 and superabsorbent polymer 202, according to some example embodiments. The vapor generator 22 shown in FIG. 1B may be any of the vapor generators 22 shown in FIGS. 2A-G.

Referring to FIG. 2A and FIG. 2B, in some example embodiments, a superabsorbent polymer 202 may be included in an interior of one or more of the surfaces defining the reservoir 23. As shown in FIG. 2A, for example, a superabsorbent polymer 202 may be included in the tube 32. As further shown in FIG. 2B, a superabsorbent polymer 202 may be included in a portion of the outer housing 16 defining at least one boundary of the reservoir 23 interior.

In some example embodiments, the superabsorbent polymer 202 may be in the form of a powder, as dispersed particles or fibers, as part of a coating layer, as part of a deposited layer, some combination thereof, or the like.

A superabsorbent polymer 202 included in a surface may be included within an interior of the material comprising the surface. For example, the superabsorbent polymer 202 may be injected, impregnated, etc. within the material comprising the tube 32 in FIG. 2A. In another example, the superabsorbent polymer 202 may be injected, impregnated, etc. within the material comprising the outer housing 16, as shown in FIG. 2B.

In some example embodiments, the superabsorbent polymer 202 may be combined with one or more materials to collectively comprise the material of a surface. For example, the superabsorbent polymer 202 may be a fibrous material, and the tube 32 may be comprised of one or more fibrous materials. The fibrous superabsorbent polymer 202 may be interwoven with the one or more fibrous materials to form the tube 32. Such a tube 32 may include interwoven fibrous superabsorbent polymer 202 that is exposed to the interior of reservoir 23.

Referring to FIG. 2C and FIG. 2D, in some example embodiments, a superabsorbent polymer 202 may be included in a superabsorbent layer 210. The superabsorbent layer 210 may be on one or more of the surfaces defining an interior of the reservoir 23.

As shown in FIGS. 2C-D, for example, the superabsorbent polymer 202 may be included in one or more superabsorbent layers 210. As shown in FIGS. 2C-2D, the superabsorbent layers 210 each include one or more superabsorbent polymers 202 and one or more binder materials 204. A superabsorbent layer 210 may be a mixture of superabsorbent polymer 202 and binder material 204. The one or more binder materials 204 may include one or more inert or substantially inert materials, relative to at least one of the superabsorbent polymer 202, a pre-vapor formulation that may be held in the reservoir 23, and one or more elements comprising the vapor generator 22. In some example embodiments, the binder material 204 includes a polyurethane binder material.

In some example embodiments, the mixture is a substantially uniform, homogenous mixture. In some example embodiments, a superabsorbent layer 210 includes a superabsorbent polymer 202 included in a superabsorbent structure, such that the mixture of a binder material 204 and one or more superabsorbent structures is heterogeneous. For example, a superabsorbent layer 210 may include one or more superabsorbent polymer 202 structures. Such structures may include spherical or substantially spherical capsules. The binder material 204 may bind the superabsorbent polymer 202 capsules to the surface 16*a*, 32*a* on which the superabsorbent layer 210 is located, respectively.

As shown in FIG. 2C, the superabsorbent layer 210 may be on an inner surface 16*a* of the outer housing 16. As shown in FIG. 2D, the superabsorbent layer 210 may be on an outer surface 32*a* of the tube 32. Each of the superabsorbent layers 210 shown in FIGS. 2C-D is on one or more surfaces that are exposed to the reservoir 23 interior. The superabsorbent layers 210 are thus each in fluid communication with an interior of a reservoir 23 that is at least partially defined by the surface on which the superabsorbent layers 210 are located, respectively.

In some example embodiments, the superabsorbent polymer 202 may be configured to absorb an amount of free water from a given mass of pre-vapor formulation. The amount of free water absorbed from the given mass of pre-vapor formulation may be equal to or greater than 10% of the given mass. For example, if and/or when the reservoir 23 holds 400 mg of pre-vapor formulation, the superabsorbent polymer 202 included in the reservoir 23 may be configured to absorb 40 mg of free water (also referred to herein as "moisture) from the 400 mg of pre-vapor formu- In some example embodiments a structure of one or more superabsorbent polymers 202 may expand in volume by a proportion of the initial volume of the superabsorbent structure. For example, if and/or when the superabsorbent polymer 202 is included in a spherical capsule structure, the spherical capsule structure may expand to approximately 125% of the initial capsule volume upon the superabsorbent polymer 202 absorbing up to a maximum amount of free water.

Referring now to Table 1 below, the amount of water that may be absorbed by the superabsorbent layer 210 may be based on the dimensions of the reservoir 23 in which the layer 210 is included, the dimensions of the superabsorbent layer 210, and the proportion of the superabsorbent layer 210 that is occupied by the superabsorbent polymer 202. In Table 1, the superabsorbent layer 210 is on an inner surface 16a of the outer housing 16 defining the outer boundary of a cylindrical reservoir 23, and the superabsorbent polymer 202 occupies approximately 40% of the volume of the superabsorbent layer 210.

Based on enabling pre-vapor formulation circulation into the superabsorbent compartment 230 while restricting the superabsorbent polymer 202 to the superabsorbent compartment 230 interior, the partition 232 may enable the pre-vapor formulation to circulate in and out of the superabsorbent compartment 230 so that the superabsorbent structures 234 held in the superabsorbent compartment 230 may remove free water from the circulating pre-vapor formulation.

In the example embodiments illustrated in FIG. 2E, the superabsorbent compartment 230 is located at an end of the reservoir 23 such that the partition 232, outer housing 16, tube 32, and gasket 14 collectively define the superabsorbent compartment 230 interior. In some example embodiments, the superabsorbent compartment 230 may be located at one or more additional locations in the reservoir 23. For example, the superabsorbent compartment 230 may be located at a midpoint in the reservoir 23, such that separate formulation compartments are located on opposite ends of the superabsorbent compartment 230.

In some example embodiments, the partition 232 may be a containment structure that at least partially encloses the

TABLE 1

| Reservoir inner diameter (cm) | Reservoir Volume (cm^3) | Reservoir Inner Surface Area (cm^2) | Layer Thickness (microns) | Layer Volume (cm^3) | Superabsorbent Volume (cm^3) | Water absorbed (mg) |
|---|---|---|---|---|---|---|
| 0.50000 | 1.17810 | 4.71239 | 10.00000 | 0.00471 | 0.00188 | 1.88496 |
| 0.50000 | 1.17810 | 4.71239 | 50.00000 | 0.02356 | 0.00942 | 9.42478 |
| 0.50000 | 1.17810 | 4.71239 | 100.00000 | 0.04712 | 0.01885 | 18.84956 |
| 0.50000 | 1.17810 | 4.71239 | 200.00000 | 0.09425 | 0.03770 | 37.69911 |
| 0.80000 | 3.01593 | 7.53982 | 10.00000 | 0.00754 | 0.00302 | 3.01593 |
| 0.80000 | 3.01593 | 7.53982 | 50.00000 | 0.03770 | 0.01508 | 15.07964 |
| 0.80000 | 3.01593 | 7.53982 | 100.00000 | 0.07540 | 0.03016 | 30.15929 |
| 0.80000 | 3.01593 | 7.53982 | 200.00000 | 0.15080 | 0.06032 | 60.31858 |
| 1.00000 | 4.71239 | 9.42478 | 10.00000 | 0.00942 | 0.00377 | 3.76991 |
| 1.00000 | 4.71239 | 9.42478 | 50.00000 | 0.04712 | 0.01885 | 18.84956 |
| 1.00000 | 4.71239 | 9.42478 | 100.00000 | 0.09425 | 0.03770 | 37.69911 |
| 1.00000 | 4.71239 | 9.42478 | 200.00000 | 0.18850 | 0.07540 | 75.39822 |

Referring to FIG. 2E, in some example embodiments, reservoir 23 may include a formulation compartment 220 and a superabsorbent compartment 230. The formulation compartment 220 may be configured to hold the pre-vapor formulation therein. The formulation compartment 220 may include a storage medium that may hold pre-vapor formulation. The superabsorbent compartment 230 may include superabsorbent structures 234 and a partition 232 that defines at least one boundary of the superabsorbent compartment 230.

The superabsorbent structures 234 included in the superabsorbent compartment 230 may include one or more superabsorbent polymers 202. The superabsorbent structures 234 may include one or more types of structures 234. The one or more types of structures 234 may include one or more capsule structures. The one or more structures may be spherical or substantially spherical.

In some example embodiments, the partition 232 may be selectively permeable. The selectively-permeable partition 232 may enable pre-vapor formulation circulation between the interiors of the formulation compartment 220 and the superabsorbent compartment 230, respectively. The selectively permeable partition 232 may restrict the superabsorbent structures 234 to the interior of the superabsorbent compartment 230, thereby reducing and/or preventing the superabsorbent polymer 202 from crossing the partition 232 into the formulation compartment 220.

superabsorbent polymer 202 to form a superabsorbent compartment 230 in the reservoir 23. For example, the partition 232 may be a bag structure that encloses one or more superabsorbent structures 234 and is located within the reservoir 23. Such a compartment 230 formed by a bag structure enclosing one or more superabsorbent structures 234 may be enclosed within the formulation compartment 220.

The partition 232 may include one or more instances of mesh material. For example, the partition 232 may include a material that has one or more holes. The one or more holes may be sufficiently small to restrict superabsorbent structures 234 from passing through the partition 232 and sufficiently large to direct pre-vapor formulation through the partition 232 to circulate between the compartments 220, 230. As a result, the partition 232 may reduce and/or prevent superabsorbent structures 234 from approaching within a certain margin proximity to the vaporizer assembly 28. Reducing and/or preventing superabsorbent structures 234 from approaching within a certain margin proximity to the vaporizer assembly 28 may reduce and/or prevent blockage of a fluid pathway between the reservoir 23 and the dispensing interface 24. Reducing and/or preventing such blockage may thereby reduce and/or prevent superabsorbent structures 234 within the reservoir 23 from at least partially restricting pre-vapor formulation from being drawn into the dispensing interface 24.

As shown in FIG. 2E, the vaporizer assembly 28 may be configured to draw pre-vapor formulation from the formulation compartment 220. As shown, the dispensing interface 24 of the vaporizer assembly 28 is coupled to the formulation compartment 220. The vaporizer assembly 28 may draw pre-vapor formulation that has circulated in and out of the superabsorbent compartment 230 at least once and therefore may be at least partially relieved of free water.

The superabsorbent structures 234 may form an absorbent bed within the superabsorbent compartment 230 interior. The superabsorbent structures 234 may be packed into the compartment interior according to a particular packing density. For example, the superabsorbent structures 234 in the compartment may form a superabsorbent bed having a packing density of approximately 0.7.

Referring now to Table 2 below, the amount of water that may be absorbed by the superabsorbent polymer 202 in a superabsorbent compartment 230 may be based on the packing density of the superabsorbent structures 234 in the superabsorbent compartment 230, the density of the superabsorbent structures 234, and the dimensions of the reservoir 23 in which the superabsorbent compartment 230 is included. In Table 2, the packing density of the superabsorbent structures 234 is approximately 0.7, the density of the superabsorbent structures 234 is approximately 1 g/cm^3, the reservoir 23 is a cylindrical reservoir that is approximately 1 cm in length. The one or more superabsorbent polymers 202 in the superabsorbent structures 234 may be configured to absorb an amount of water that is equal to the mass of the superabsorbent polymer 202. In some example embodiments, the one or more superabsorbent polymers 202 in the superabsorbent structures 234 may be configured to absorb an amount of water that is greater than the mass of the superabsorbent polymer 202.

TABLE 2

| Superabsorbent Compartment Length (cm) | Compartment Volume (cm^3) | Superabsorbent Structure Volume (cm^3) | Water Absorbed (mg) |
| --- | --- | --- | --- |
| 0.25000 | 0.09817 | 0.06872 | 68.72234 |
| 0.50000 | 0.19635 | 0.13744 | 137.44468 |
| 0.75000 | 0.29452 | 0.20617 | 206.16702 |
| 1.00000 | 0.39270 | 0.27489 | 274.88936 |
| 0.25000 | 0.25133 | 0.17593 | 175.92919 |
| 0.50000 | 0.50265 | 0.35186 | 351.85838 |
| 0.75000 | 0.75398 | 0.52779 | 527.78757 |
| 1.00000 | 1.00531 | 0.70372 | 703.71675 |
| 0.25000 | 0.39270 | 0.27489 | 274.88936 |
| 0.50000 | 0.78540 | 0.54978 | 549.77871 |
| 0.75000 | 1.17810 | 0.82467 | 824.66807 |
| 1.00000 | 1.57080 | 1.09956 | 1099.55743 |

Referring to FIG. 2F, in some example embodiments the superabsorbent polymer 202 may be included within a storage medium 240 of the reservoir 23. In some example embodiments, the one or more superabsorbent polymers 202 may be included within an interior of the storage medium 240. For example, the superabsorbent polymer 202 may be injected, impregnated, etc. within the storage medium 240. In some example embodiments, the superabsorbent polymer 202 may be a fibrous material that is interwoven with one or more materials comprising the storage medium 240. In some example embodiments, the superabsorbent polymer 202 is included in a layer ("coating") on one or more outer surfaces of the storage medium material.

Referring to FIG. 2G, in some example embodiments, the superabsorbent polymer 202 is included in a formulation mixture 250 that further includes the pre-vapor formulation 252. The formulation mixture 250 may be a liquid mixture. The formulation mixture 250 may be a uniform or substantially uniform mixture of the pre-vapor formulation 252 and the superabsorbent polymer 202. The formulation mixture 250 may be a suspension of the superabsorbent polymer 202 in the pre-vapor formulation 252. The formulation mixture 250 may be a suspension of the pre-vapor formulation 252 in the superabsorbent polymer 202. The formulation mixture 250 may be added to the reservoir 23 subsequent to mixing the pre-vapor formulation 252 and the superabsorbent polymer 202 together to establish the formulation mixture 250. In some example embodiments, the formulation mixture 250 may be a mixture of 40% superabsorbent polymer 202 and 60% pre-vapor formulation 252 by volume. In some example embodiments, the formulation mixture 250 may be a mixture of 40% superabsorbent polymer 202 and 60% pre-vapor formulation 252 by mass.

In the example embodiments illustrated in FIG. 2G, the pre-vapor formulation 252 in the formulation mixture 250 is represented by hollow circles and the superabsorbent polymer 202 in the formulation mixture 250 is represented by filled circles. It will be understood that the illustrated representations 250, 252 are representative of a mixture of the pre-vapor formulation 252 and the superabsorbent polymer 202 in the formulation mixture 250 and are not intended to indicate that the pre-vapor formulation 252 and superabsorbent polymer 202 are each quantized particles, elements, etc. within a mixture 250. For example, in some example embodiments, the pre-vapor formulation 252 and the superabsorbent polymer 202 may both be liquids, such that the formulation mixture 250 is a solution of at least pre-vapor formulation 252 and superabsorbent polymer 202.

In some example embodiments, the formulation mixture 250 may include a pre-vapor formulation 252 and superabsorbent polymer 202 that are in different phases, respectively. For example, the formulation mixture 250 may include a dispersion, a suspension, some combination thereof, or the like. The formulation mixture 250 may include a dispersion, suspension, etc. of superabsorbent polymer 202 gel particles in a pre-vapor formulation. The formulation mixture 250 may include a dispersion, suspension, etc. of superabsorbent polymer 202 solid particles in a pre-vapor formulation, some combination thereof, or the like. In some example embodiments, the pre-vapor formulation 252 may be in a phase that is different from a liquid phase. For example, the pre-vapor formulation 252 may be a liquid, a gel material, a solid material, some combination thereof, or the like.

Figure 3A:
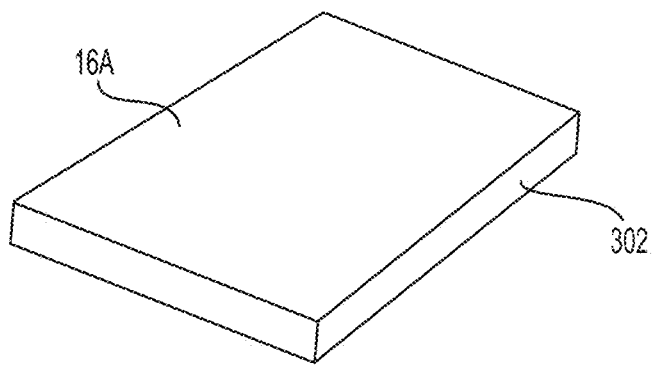
FIG. 3A, FIG. 3B, and FIG. 3C illustrate a method of at least partially forming a cartridge that includes a superabsorbent polymer on a surface that at least partially defines an interior of a reservoir of the cartridge, according to some example embodiments.
Figure 3B:
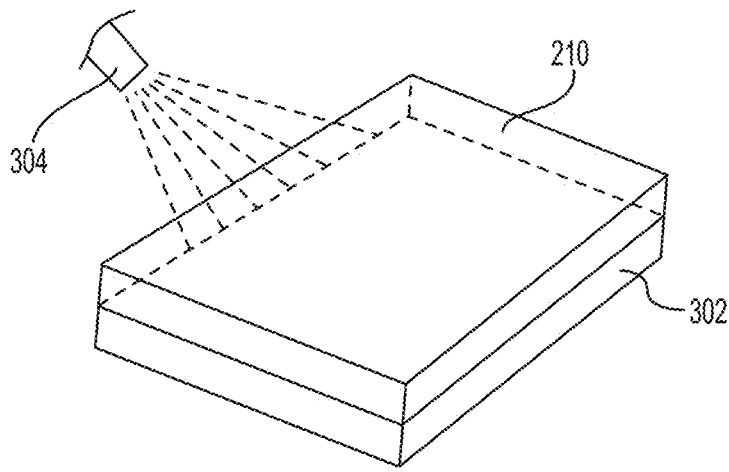
Figure 3C:
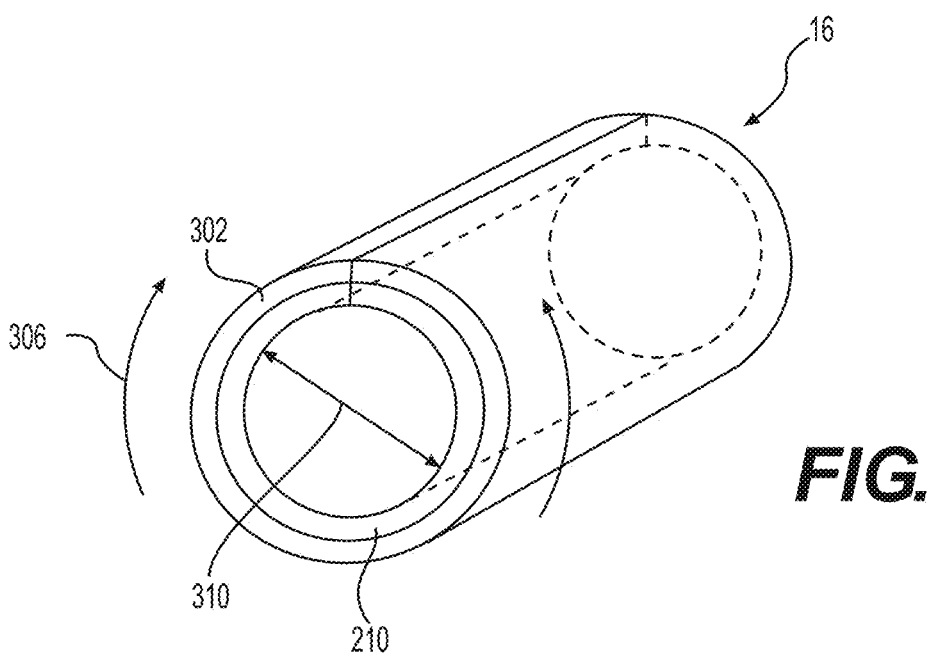

FIG. 3A, FIG. 3B, and FIG. 3C illustrate a method of at least partially forming a cartridge 70 that includes a superabsorbent polymer 202 on a surface that at least partially defines an interior of a reservoir 23 of the cartridge 70, according to some example embodiments.

In some example embodiments, a superabsorbent polymer 202 may be included in a superabsorbent layer 210 that is applied to one or more surfaces. The one or more surfaces may at least partially define an interior of the cartridge 70, such that the one or more surfaces at least partially define a reservoir in the cartridge.

Referring back to FIGS. 1A-B, the interior of the cartridge 70 may be at least partially defined by the outer housing 16. The outer housing 16, as shown in FIG. 1A-B, may be a cylinder that defines a cylindrical interior of the cartridge 70. At least a portion of the inner surface 16a of the outer housing 16 may define an outer boundary of the reservoir 23.

Referring back to FIGS. 3A-C, the housing 16 may include a material 302 that is manipulated 306 from an initial shape into a shape that at least partially defines an interior of the cartridge 70. In the example embodiments shown in FIGS. 3A-C, the outer housing 16 material 302 may initially be a flat surface having a planar initial shape. The material 302 may be manipulated 306 from a planar shape into a circular cylindrical final shape to form the outer housing 16. It will be understood that the initial shape and final shape may be different from the shapes illustrated in FIGS. 3A-C. For example, the initial shape of the outer housing material 302 may be a curved surface and the final shape may be a triangular cylinder shape.

In the example embodiments shown in FIGS. 3A-C, a superabsorbent layer 210 may be formed on the outer housing material 302 during a process of manipulating the outer housing material 302 into a final shape to form the outer housing 16. As shown, the superabsorbent layer 210 may be applied to a surface 16a of the outer housing material 302 prior to manipulating the outer housing material 302 into a final shape to form the outer housing 16.

As shown in FIG. 3A, the outer housing material 302 may be in an initial shape that is planar or substantially planar. The outer housing material 302 may have an exposed surface 16a.

As shown in FIG. 3B, a superabsorbent layer 210 may be applied to the exposed surface 16a so that the superabsorbent layer 210 is on the exposed surface 16a of the outer housing material 302. The superabsorbent layer 210 may be applied to the exposed surface 16a by one or more applicators 304.

In some example embodiments, the one or more applicators 304 may include a sprayer device that sprays the material comprising the superabsorbent layer 210 onto the exposed surface 16a to form the superabsorbent layer 210 on the exposed surface 16a.

In some example embodiments, the superabsorbent layer 210 may be applied to the surface 16a by one or more various applicators 304. In some example embodiments, the superabsorbent layer 210 may be applied to the surface 16a via lamination, deposition, coating via a non-physical applicator (e.g., a sprayer), coating via a physical applicator (e.g., a brush device), some combination thereof, or the like.

As shown in FIG. 3C, the outer housing material 302 may be manipulated 306 from the initial shape as shown in FIG. 3A-B to a final shape that at least partially defines an exterior of the cartridge 70 and an interior of the cartridge 70. The outer housing material 302 in the final shape may be referred to as the outer housing 16.

Such manipulation 306 may be implemented via one or more various systems. The outer housing material 302 may be manipulated 306 into the final shape based on manipulation of the outer housing material 302 by one or more manipulators. The manipulator may be one or more of a human operator, a machine, some combination thereof, etc. The machine may be a fabrication machine. The machine may be a special purpose machine configured to implement the manipulating based on executing program code stored in a memory device.

In the example embodiments shown in FIG. 3C, the outer housing material 302 is manipulated 306 into a circular cylinder final shape to form an outer housing 16 defining an interior space 310 that may at least partially comprise an interior of the cartridge 70 shown in FIG. 1B.

As shown in FIG. 3C, the outer housing material 302 is manipulated 306 so that the surface 16a defines an outer boundary of the interior space 310. Because the superabsorbent layer 210 is on the surface 16a, the superabsorbent layer 210 is exposed to the interior space 310 based on the outer housing material 302 being manipulated into the final shape.

In some example embodiments, the superabsorbent layer 210 may be applied to the surface 16a subsequent to the outer housing material 302 being manipulated 306 into the final shape. For example, the superabsorbent layer 210 may be applied to the surface 16a, subsequent to the outer housing 16 being formed via the manipulation of the outer housing material 302 as shown in FIG. 3C.

In some example embodiments, some or all of the process illustrated in FIGS. 3A-C may be implemented in the presence of a "dry" environment. In some example embodiments, a "dry" environment is an environment in which the relative humidity is less than 30%. In some example embodiments, a "dry" environment is an environment in which the relative humidity is 0%.

Figure 4:
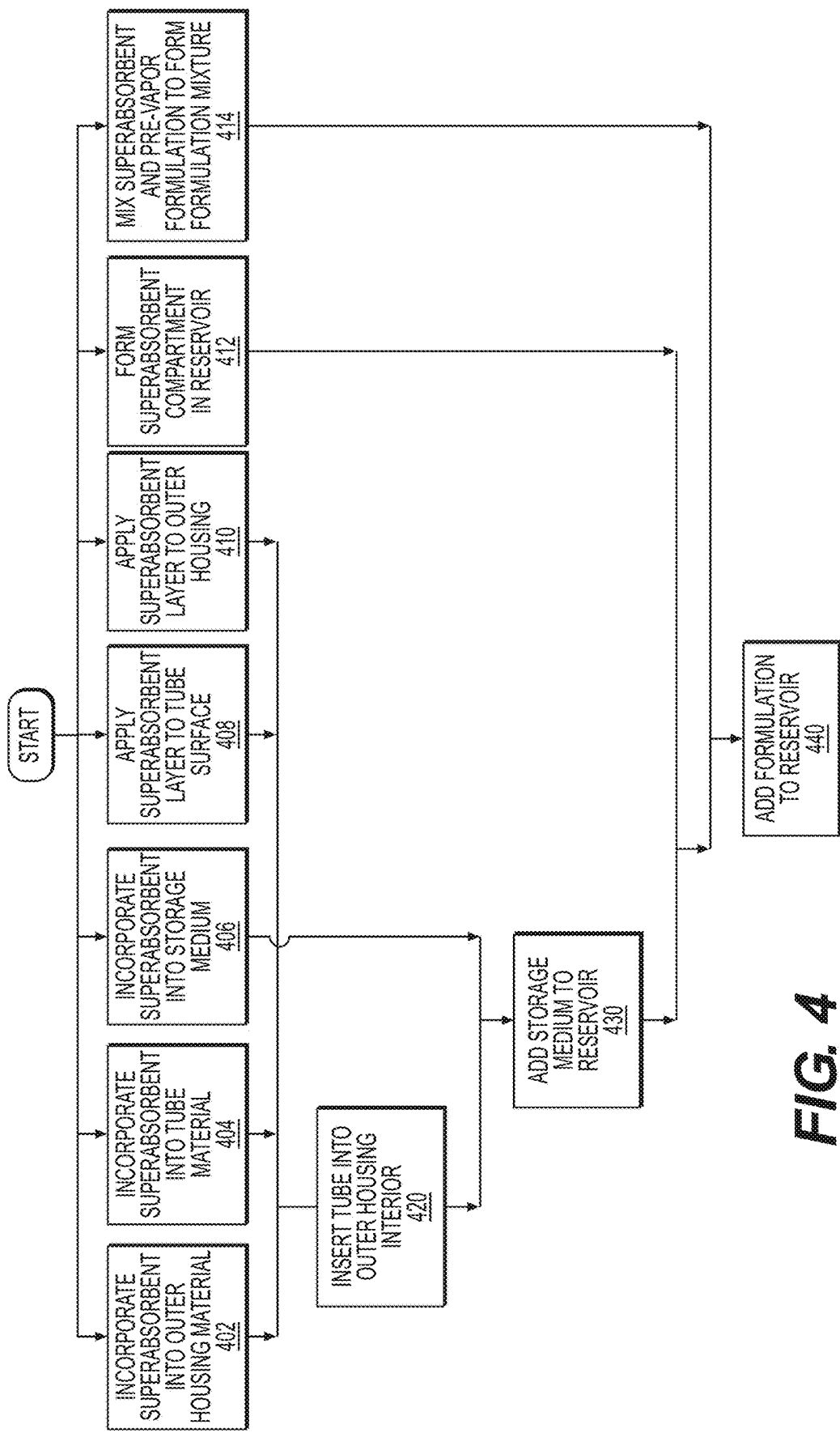
FIG. 4 is a flowchart illustrating a method for configuring a cartridge to absorb free water from a pre-vapor formulation held in the reservoir, according to some example embodiments.

FIG. 4 is a flowchart illustrating a method for configuring a cartridge to absorb free water from a pre-vapor formulation held in the reservoir, according to some example embodiments. The configuring may be implemented with regard to any of the example embodiments of cartridges included herein. In some example embodiments, one or more portions of the configuring are implemented by a configuror. The configuror may be one or more of a human operator, a machine, some combination thereof, etc. The machine may be a fabrication machine. The machine may be a special purpose machine configured to implement the configuring based on executing program code stored in a memory device. The configuror may include the manipulator described above with reference to FIGS. 3A-C.

Referring to FIG. 4, in some example embodiments, one or more of 402-414 may be implemented. In some example embodiments, a selected one of 402-414 is implemented and a remainder one or more of 402-414 is not implemented.

At 402, the configuror incorporates a superabsorbent polymer into an outer housing material comprising at least a portion of the outer housing. The superabsorbent polymer may be incorporated into the outer housing material through at least one of impregnation into the outer housing material, injection into the outer housing material, some combination thereof, or the like. The superabsorbent polymer may be incorporated into the outer housing material prior to the outer housing material being manipulated to form the outer housing.

At 404, the configuror incorporates a superabsorbent polymer into at least a portion of the inner tube material. The superabsorbent polymer may be incorporated into the outer housing material through at least one of impregnation into the inner tube material, injection into the inner tube material, some combination thereof, or the like. The superabsorbent polymer may be incorporated into the inner tube material prior to the inner tube material being manipulated to form the inner tube.

At 406, the configuror incorporates a superabsorbent polymer into at least a portion of a storage medium material. The superabsorbent polymer may be incorporated into the storage medium material through at least one of impregnation into the storage medium material, injection into the storage medium material, some combination thereof, or the like. The superabsorbent polymer may be incorporated into the storage medium material prior to the storage medium material being manipulated to form the storage medium.

At 408, the configuror applies a superabsorbent layer to a surface of the inner tube material. The superabsorbent layer may include at least one superabsorbent polymer and at least one binder material. The superabsorbent polymer may be included in one or more superabsorbent structures. The superabsorbent layer may be applied to the surface by one or more applicators. The superabsorbent layer may be applied to a surface of the inner tube material prior or subsequent to the inner tube material being manipulated to form the inner tube.

At 410, the configuror applies a superabsorbent layer to a surface of the outer housing material. The superabsorbent layer may include at least one superabsorbent polymer and at least one binder material. The superabsorbent polymer may be included in one or more superabsorbent structures. The superabsorbent layer may be applied to the surface by one or more applicators. The superabsorbent layer may be applied to a surface of the outer housing material prior or subsequent to the outer housing material being manipulated to form the outer housing.

At 420, the configuror inserts the inner tube into an interior space defined by the outer housing to at least partially define the reservoir between an outer surface of the inner tube and an inner surface of the outer housing.

At 430, the configuror adds the storage medium into the interior of the reservoir.

At 412, the configuror forms a superabsorbent compartment in at least a portion of the reservoir interior. Forming a superabsorbent compartment in a portion of the reservoir interior may define a remainder of the reservoir interior as a formulation compartment of the reservoir. The superabsorbent compartment may include one or more superabsorbent structures and a selectively permeable partition that contains the superabsorbent structures within an interior of the superabsorbent compartment and enables pre-vapor formulation circulation through the partition between the interior of the superabsorbent compartment and one or more formulation compartments external to the superabsorbent compartment.

At 414, the configuror mixes at least one superabsorbent polymer with at least one pre-vapor formulation to form a formulation mixture. The at least one superabsorbent polymer may be included in one or more superabsorbent structures included in the formulation mixture. The formulation mixture may include a suspension, a homogenous mixture, a heterogeneous mixture, a solution, a colloid, some combination thereof, or the like.

At 440, the configuror adds at least the pre-vapor formulation to the reservoir. In some example embodiments, where 414 is implemented such that a formulation mixture including the pre-vapor formulation and the superabsorbent polymer is formed, the configuror may add the formulation mixture to the reservoir at 440.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A cartridge for an e-vaping device, the cartridge comprising:
    a reservoir configured to hold a pre-vapor formulation, the reservoir including a plurality of compartments, the plurality of compartments including a formulation compartment and an absorbent compartment including a cross-linked polyacrylate copolymer and at least one binder, the absorbent compartment separated from the formulation compartment by a selectively permeable partition configured to enable the pre-vapor formulation to circulate between the absorbent compartment and the formulation compartment, the cross-linked polyacrylate copolymer in fluid communication with an interior of the absorbent compartment, the cross-linked polyacrylate copolymer being configured to absorb free water from the pre-vapor formulation within the absorbent compartment and retain the free water in the absorbent compartment, the cross-linked polyacrylate copolymer is substantially inert to the pre-vapor formulation; and
    a vaporizer assembly configured to draw at least some of the pre-vapor formulation from the formulation compartment, the vaporizer assembly further configured to vaporize the drawn pre-vapor formulation to form a vapor.

2. The cartridge of claim 1, wherein
    the reservoir includes a storage medium configured to hold the pre-vapor formulation.

3. The cartridge of claim 1, wherein
    the reservoir includes
    a cylindrical outer housing at least partially defining an outer surface of the reservoir, and
    an inner tube defining an inner surface of the reservoir, such that the reservoir interior is an annulus.

4. The cartridge of claim 2, wherein the cross-linked polyacrylate copolymer is separated from the storage medium.

5. The cartridge of claim 1, wherein the absorbent compartment is distal to the vaporizer assembly.

6. An e-vaping device, comprising:
    the cartridge of claim 1; and
    a power supply configured to supply electrical power to the vaporizer assembly.

7. The e-vaping device of claim 6, wherein
    the reservoir includes a storage medium configured to hold the pre-vapor formulation.

8. The e-vaping device of claim 7, wherein the cross-linked polyacrylate copolymer is separated from the storage medium.

9. The e-vaping device of claim 6, wherein
    the reservoir includes
    a cylindrical outer housing at least partially defining an outer surface of the reservoir, and
    an inner tube defining an inner surface of the reservoir, such that the reservoir interior is an annulus.

10. The e-vaping device of claim 6, wherein the power supply includes a rechargeable battery.

11. The e-vaping device of claim 6, wherein the cartridge and the power supply are removably coupled together.

12. The e-vaping device of claim 6, wherein the absorbent compartment is distal to the vaporizer assembly.

13. The cartridge of claim 1, wherein
    the vaporizer assembly includes a dispensing interface coupled to the formulation compartment, and
    the absorbent compartment is at an end of the reservoir furthest from the dispensing interface.

\* \* \* \* \*